United States Patent [19]
Ebenhoeh

[11] 4,423,391
[45] Dec. 27, 1983

[54] EQUALIZER CIRCUIT FOR COMMUNICATION SIGNALS

[75] Inventor: Peter Ebenhoeh, Munich, Fed. Rep. of Germany

[73] Assignee: Siemens Aktiengesellschaft, Berlin and Munich, Fed. Rep. of Germany

[21] Appl. No.: 284,657

[22] Filed: Jul. 20, 1981

[30] Foreign Application Priority Data

Sep. 8, 1980 [DE] Fed. Rep. of Germany ....... 3033762

[51] Int. Cl.³ .............................................. H03H 7/03
[52] U.S. Cl. .................................. 333/28 R; 330/304
[58] Field of Search ............. 333/28 R; 330/304, 146; 307/262

[56] References Cited

U.S. PATENT DOCUMENTS 2,096,027 10/1937 Bode .................................. 333/28 R
3,921,105 11/1975 Brglez .............................. 333/28 R

OTHER PUBLICATIONS

Bell System Technical Journal, vol. XVII, 1938, pp. 229-244.
IEEE Trans. on Circuits and Systems, vol. CAS-22, No. 5, May 1975, pp. 415-418.
IEEE Trans. on Circuits and Systems, vol. CAS-24, No. 6, Jun. 1977, pp. 318-320.

Primary Examiner—Paul L. Gensler
Attorney, Agent, or Firm—Hill, Van Santen, Steadman & Simpson

[57] ABSTRACT

An equalizer circuit for communication signals is constructed as an active Bode equalizer employing an amplifier having anti-phase outputs and a bridge circuit connected to the outputs. The susceptibility of the equalizer to manufacturing tolerances is reduced insofar as possible and the transfer function of a passive Bode equalizer is retained, as far as possible, even at frequencies which lie far above 10 MHz.

9 Claims, 3 Drawing Figures

EQUALIZER CIRCUIT FOR COMMUNICATION SIGNALS

BACKGROUND OF THE INVENTION

1. Field of the Invention

The present invention relates to an equalizer circuit for communication signals, which is designed in the manner of an active Bode equalizer employing an amplifier having anti-phase outputs and an output-connected bridge circuit.

2. Description of the Prior Art

Variable equalizer circuits have been disclosed by H. W. Bode in the periodical "Bell System Technical Journal" 1938, Vol. 17, pp. 229–244, for which the expression "Bode equalizer" has also become a standard. As is known, these are circuits in which, fundamentally, a bridged T-section is employed. Additional circuits are assigned to the bridge arm and to the shunt arm which are also referenced as auxiliary quadripoles with proper wave impedance. The manner of operation and the use of possibilities of such equalizers are known per se, so that they need not be discussed herein in detail, the above citation being fully incorporated herein by this reference. The transfer function $T_r(j\omega)$ of such equalizers can generally be presented as $$T_r(j\omega) = \frac{T(j\omega)}{T_0} = \frac{1 - \theta H_0 \cdot H(j\omega)}{1 + \theta H_0 \; H(j\omega)} \quad (1)$$

where $T_0^{-1} = q_0 = e^{a_0}$ is the residual attenuation factor, $\theta$ is a real switching constant with $|\theta| \leq 1$, $H_0$ is a circuit-dependent shift constant, and $H(j\omega)$ is a function determining the frequency response of the transfer function with $|H(j\omega)| \leq 1$.

The equalizers mentioned above are realized with concentrator elements, i.e. with resistors, coils and capacitors. If one wishes to realize attenuation equalizers having high attenuation shifts for $|\theta| < 1$ with such structures, then the residual attenuation necessary for a predetermined attenuation shift increases rapidly, which again requires the use of additional amplifier circuits.

Because of the desire to provide at least partial alleviation, active equalizer circuits have also been heretofore disclosed. An equalizer which, in a certain sense, can at least be designated as an active Bode equalizer is specified in the periodical IEEE Transactions on Circuits and Systems, Vol. CAS-22, No. 5, May 1975, pp. 415–418, also fully incorporated herein by this reference. The difficulty occurring in this known equalizer can, above all, be seen therein that an excursion in both directions is possible only with the assistance of a variable negative resistance. This limits the areas of application to frequencies which lie below 10 kHz.

An equalizer of the type initially mentioned is specified for frequencies which lie below 10 MHz in the publication IEEE Transactions on Circuits and Systems, Vol. CAS-24, No. 6, June 1977, pp. 318–320, also fully incorporated herein by this reference. In this equalizer the transfer function $T_r$ of expression (1) above is realized in the form $$T_r(j\omega) = 2(\tfrac{1}{2} - T_1(j\omega)); \; T_1(j\omega) = \frac{\theta H_0 H(j\omega)}{1 + \theta H_0 \cdot H(j\omega)}$$

by employing two operational amplifiers having differential inputs and differential outputs with the assistance of inverse feedbacks. The known circuit has the characteristic that the maximum shift is limited to ±9 dB, whereby the maximum shift is only achieved with $Z(j\omega)$ as a reactance network.

The residual attenuation is not freely selectable; independently of the shift, it amounts to 6 dB. The switching constant is, for example, $|\theta| \leq 0.5$. What further complicates the practical realization of this known circuit is that two reactance bipoles must be designed so as to be completely identical to one another. For this reason, the circuit is relatively sensitive to manufacturing tolerances, since deviations from the rated values of the circuit elements already have a significant disruptive effect on the symmetry of the circuit.

SUMMARY OF THE INVENTION

The object of the present invention is to alleviate the aforementioned difficulties insofar as possible and, in particular, to provide circuits for an active Bode equalizer in which the susceptibility to manufacturing tolerances is minimized insofar as possible and in which, in addition, the initially-specified transfer function of the passive Bode equalizer is retained, even in a frequency range lying far above 10 MHz. In addition, even given loss-burdened networks, significantly greater maximum shifts should be able to be achieved.

Proceeding from an equalizer of the initially-mentioned type, the above object is achieved, according to the present invention, in that a resistor in the first amplifier output and a resistor in the second amplifier output together form the first bridge arm and in that a resistor connected to a reference potential in the first amplifier output and the input resistance of a T-section bridged in proper wave impedance, together with a resistor in the second amplifier output, form the impedance of the second bridge arm.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
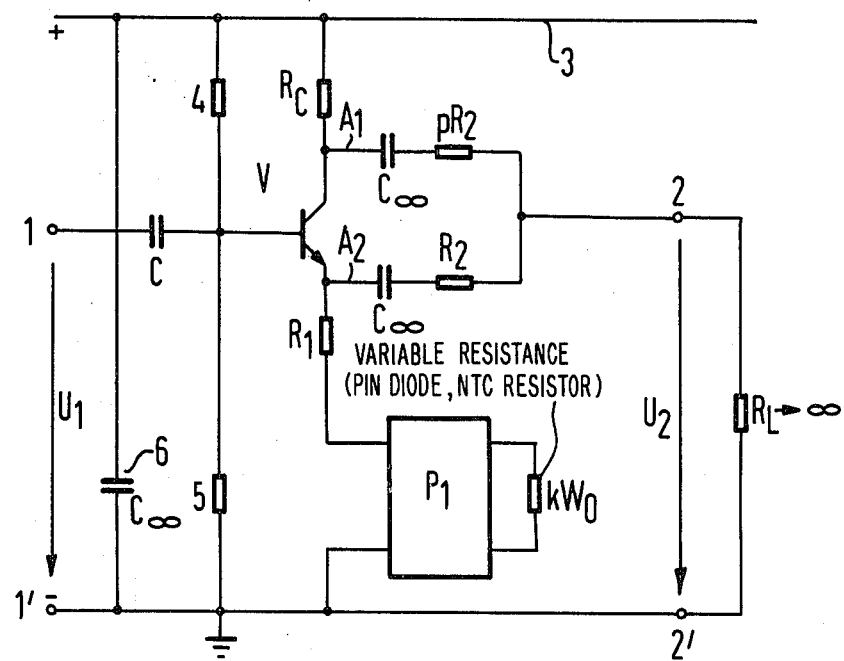
FIG. 1 is a schematic circuit diagram of a circuit constructed in accordance with the present invention having a transistor as an amplifier.

In the exemplary embodiment illustrated in FIG. 1, a transistor stage is employed as an amplifier V, the transistor stage lying, via a d.c. voltage supply line 3, at the positive terminal of a d.c. voltage source, whose negative terminal lies at the connection line identified at a reference potential, here ground. The base bias is obtained in a known manner from a resistor 4 and a resistor 5 connected as a voltage divider. A capacitor 6 having a capacitance value $C_\infty$ is also connected between the positive and negative terminals of the d.c. voltage source. The indication "$\infty$" means that a d.c. voltage cutoff is to occur here and, thereby, the capacitance value of the appertaining capacitor is so large that alternating signals are practically shunted. The input alternating voltage $U_1$ is applied between the terminals 1 and 1' and is supplied, via a coupling capacitor C to the base of the transistor. The output terminals are referenced 2 and 2' and the output alternating voltage $U_2$ is tapped by way of a load resistor $R_L$. The "∞" character likewise illustrated here is meant to indicate that the terminating or load resistance $R_L$ should not load the amplifier stage V insofar as possible. A resistor $R_C$ is connected between the d.c. voltage terminal 3 and the collector of the transistor. A resistor $R_1$, to which a quadripole $P_1$ is assigned, is connected between the emitter and the reference potential. The quadripole $P_1$ is terminated with the terminating impedance $kW_0$ ($0 \leq k \leq \infty$). The collector is followed by a capacitor whose capacitance value is specified at $C_\infty$; and the same is true of the emitter. What is here also meant to be shown is that these capacitors only serve for cutting off the direct current and represent practically no reactive impedance for alternating signals of the operating frequency range. Following the capacitor in the collector circuit is a resistor $pR_2$ and a resistor $R_2$ in the emitter circuit. The inner connection of these two resistors leads directly to the output terminal 2. The circuit design illustrated in FIG. 1 shows that the amplifier stage V has two outputs $A_1$ and $A_2$ at which the signals lie in anti-phase with respect to one another. The circuit has the property of a bridge circuit and, accordingly, the first bridge arm is formed by the resistors $pR_2$ and $R_2$. The second bridge arm is formed by the resistor $R_C$ which, of course, lies at a reference potential in terms of alternating voltage via the capacitor 6, and is further formed by the input resistance of the T-section $P_1$ bridged with the proper wave impedance, together with the resistor $R_1$ connected in series therewith in the exemplary embodiment.

Let the following be pointed out concerning the properties of the circuits described here.

What is meant by the term "active Bode equalizer" are equalizer structures which meet the following requirements;

the equalizers should contain at least one active element as an integral component of the equalizer;

the transfer function should be clearly determined by the expression (1); and the attenuation shift $\Delta a\ (\omega, \theta)$ should be independent of the required residual attenuation, at least in a certain range.

The circuit illustrated in FIG. 1 meets these conditions. Therefore, the following applies for a symmetrical shift equalizer with the circuit $P_1$ constructed in accordance with FIG. 2:

$$T_r(j\omega) = \frac{T(j\omega)}{T_o} = \frac{1 - \theta H_o \cdot H(j\omega)}{1 + \theta H_o \cdot H(j\omega)} \quad (1)$$

where $$\theta = \frac{k-1}{k+1} \quad o \leq k \leq \infty \quad |\theta| \leq 1, \quad (2)$$

$$H_o = \frac{1 - \frac{p}{p+1} q_o}{1 + \frac{p}{p+1} q_o} \quad q_o \leq 0\ |H_o| \leq 1, \quad (3)$$

$$H(j\omega) = 1 + \left(\frac{ZE}{W_o}\right)^{-2} \quad (4)$$

where ZE is the series arm bridged resistance and $W_0$ is the resistance of each series arm resistor and the dimensioning $$R_1 = W_o \cdot \frac{p}{1+p} q_o - \alpha \quad (5)$$

where $$\alpha = \frac{1}{y_{21E}} \cdot \left(1 + \frac{R_c}{R_2} \frac{1}{1+p}\right) \quad (6)$$

(whereby $y_{21E}$ indicates the complex forward steepness of the transistor in emitter circuit)

$$R_c = R_1 - \frac{1+p}{p} \cdot \frac{1}{q_o} \cdot W_o \quad (7)$$

$$p > \frac{R_c}{W_o + R_1}. \quad (8)$$

Figure 2:
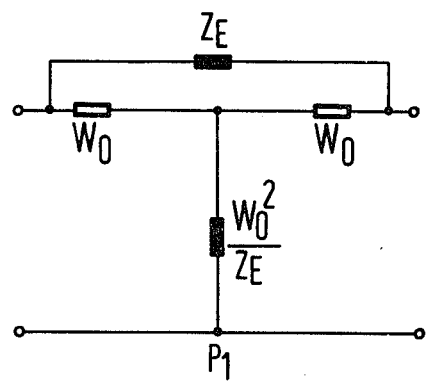
FIG. 2 is a schematic circuit diagram of a T-section bridged with proper wave impedance referenced $P_1$ in FIG. 1.

On the basis of FIG. 2, let the auxiliary quadripole referenced $P_1$ be, in particular, the matched bridge T-section.

As is readily apparent from FIG. 2, it is thereby a case, in a known manner, of a bridged T-section with the resistors $W_0$ connected in its series arm. A resistor with a resistance value $W_0^2/Z_E$ is in the shunt arm and a resistor $Z_E$ bridges the series arm since, of course, the bridging and shunt arms are reciprocal in resistance with respect to the value of the resistor $W_0$.

In FIG. 2, of course, only the basic circuitry of such a bridged T-section is illustrated. Depending on the requirements made of the equalizer, iterative networks consisting of such T-sections with the proper wave impedance can also be employed in a known manner.

Figure 3:
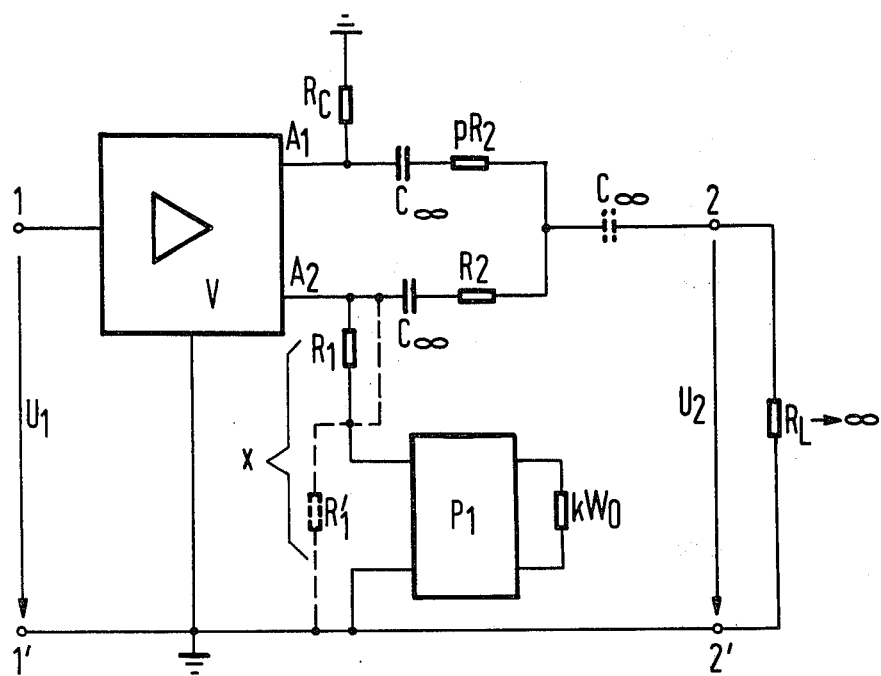
FIG. 3 is a schematic circuit diagram which builds on the circuits of FIGS. 1 and 2.

FIG. 3 illustrates the general circuitry of an active Bode equalizer. For the purpose of greater clarity, d.c. voltage supplies have not been illustrated and elements having the same function are referenced with the same reference characters as in FIG. 1, so that the description given there can be directly applied by analogy to the circuit of FIG. 3. FIG. 3 also shows that the capacitors $C_\infty$ following the output $A_1$, $A_2$ can also be connected preceding the terminal 2, as indicated by broken lines. As already explained above, it is here a matter of direct current cut-off for which other possibilities are also conceivable under certain conditions.

A possible circuit variation is further illustrated in broken lines in FIG. 3. In this variation it can be seen that the resistor $R_1$ need not of necessity be, so to speak, preconnected in series to the T-section $P_1$ with proper wave impedance. Instead, for example, given asymmetrical shift equalizers, a resistor $R_1'$ can be connected to the variable input resistor of the T element $P_1$ with proper wave impedance, whereby, of course, care must be taken that the resistor $R_1'$ is also connected to the output $A_2$ of the amplifier V at the same time. Any random amplifier arrangements, for example, operational amplifiers as well, can be employed for the amplifier V. Amplifiers having inverse feedback loops between the outputs $A_1$ and $A_2$ likewise may be considered for this purpose. It is only essential that the amplifier V contain two equivalent antiphase i.e. inverting outputs $A_1$ and $A_2$. These outputs must be terminated with the resistors $pR_2$ and $R_2$ and, additionally, one of the outputs must be terminated with a variable terminating impedance X, i.e. in the example the amplifier output $A_2$.

The impedance X which, of course, comprises the resistor $R_1$ or, respectively, the resistor $R_1'$ and the input resistance of the T-section $P_1$ with proper wave impedance can be varied by varying the terminating impedance $kW_0$. Particularly, when such an equalizer is employed in a carrier frequency system, and in regenerators of PCM transmission systems, one will be interested in designing the equalizer as so-called automatic equalizer, i.e. as a controllable equalizer.

In this case, it is advantageous to partially or entirely replace the terminating impedance $kW_0$ with a controllable resistor. In particular, one thereby envisions the use of PIN diodes or, negative temperature coefficient resistors. In this case, a control voltage generated in the transmission system will also be directly supplied to the PIN diode or to the negative temperature coefficient resistor and, therefore, the resistance value of the terminating impedance $kW_0$ will be varied.

Although I have described my invention by reference to particular illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An active Bode equalizer circuit comprising:
    a circuit input for receiving communication signals and circuit output, including first and second terminals, for emitting anti-phase equalized signals;
    an amplifier including an input connected to said circuit input and first and second outputs;
    a first resistor, forming a first bridge arm, connected between said first output and a supply potential;
    a second resistor, forming a second bridge arm, connected between said first output and said first terminal of said circuit output;
    a third resistor, forming a third bridge arm, connected to said second output and to said first terminal of said circuit output;
    a two-terminal network, forming a fourth bridge arm, connected to a reference potential, said second terminal of said circuit output also connected to the reference potential,
    said two-terminal network comprising a matched bridged T-section, including first and second ports, and a terminating impedance connected across said second port; and
    a fourth resistor connected in circuit with said second output and said first port of said T-section.

2. The equalizer circuit of claim 1, wherein:
    said fourth resistor is connected in series between said second output and said T-section.

3. The equalizer circuit of claim 1, wherein:
    said fourth resistor is connected in parallel across the input resistance of said T-section.

4. The equalizer circuit of claim 1, and further comprising:
    a capacitor connected in series with at least one of said amplifier outputs.

5. The equalizer circuit of claim 1, and further comprising:
    a pair of capacitors connected in series with respective ones of said amplifier outputs.

6. The equalizer circuit of claim 1, and further comprising:
    a capacitor connected in series with both of said amplifier outputs.

7. The equalizer circuit of claim 1, wherein:
    said T-section comprises a variable terminating impedance.

8. The equalizer circuit of claim 7, wherein:
    said terminating impedance comprises a PIN diode.

9. The equalizer circuit of claim 7, wherein:
    said terminating impedance comprises a negative temperature coefficient resistor.

* * * * *